(12) United States Patent
Watanabe (10) Patent No.: US 12,535,791 B2
(45) Date of Patent: Jan. 27, 2026

(54) NUMERICAL CONTROL DEVICE, MACHINING SYSTEM SIMULATOR, AND NUMERICAL CONTROL PROGRAM

(71) Applicant: FANUC CORPORATION, Yamanashi (JP)

(72) Inventor: Toshihiro Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 437 days.

(21) Appl. No.: 18/263,355

(22) PCT Filed: Apr. 22, 2021

(86) PCT No.: PCT/JP2021/016306
§ 371 (c)(1),
(2) Date: Jul. 28, 2023

(87) PCT Pub. No.: WO2022/224407
PCT Pub. Date: Oct. 27, 2022

(65) Prior Publication Data
US 2024/0302814 A1 Sep. 12, 2024

(51) Int. Cl.
*G05B 19/404* (2006.01)
*B23Q 15/00* (2006.01)
(Continued)

(52) U.S. Cl.
CPC ....... *G05B 19/404* (2013.01); *G05B 19/4069* (2013.01); *B23Q 15/00* (2013.01);
(Continued)

(58) Field of Classification Search
CPC ........ B23Q 15/00; B23Q 15/14; B23Q 15/22; B23Q 15/28; B23Q 17/00; G05B 19/18;
(Continued)

(56) References Cited

U.S. PATENT DOCUMENTS 4,294,566 A * 10/1981 Boone ................. B23B 27/1622
407/104
5,929,584 A * 7/1999 Gunnarsson ....... G05B 19/4015
901/42
(Continued)

FOREIGN PATENT DOCUMENTS

JP H05-165509 A 7/1993
JP H07-314290 A 12/1995
(Continued)

OTHER PUBLICATIONS

International Search Report issued in PCT/JP2021/016306; mailed Jul. 6, 2021.

*Primary Examiner* — Ronald D Hartman, Jr.
(74) *Attorney, Agent, or Firm* — Studebaker Brackett PLLC (57) ABSTRACT

A numerical control device according to one aspect of the present disclosure capable of easily setting a tip point control is provided with: an edge shape information storage unit; a center position calculation unit that calculates a center position of rotation of a multi-edge tool having machining edges; an edge switching determination unit that determines whether or not edge switching is to be performed; a calculation method changing unit that takes the edge shape information into account and changes, in association with the edge switching, a method for calculating the center position by the center position calculation unit; a tip position back calculation unit that, on the basis of the calculation method changed by the calculation method changing unit, back-calculates a tip position after the edge switching from the center position immediately before the edge switching; and a change amount calculation unit that calculates, on the basis of a tip position and a shaft angle before the edge switching and the tip position and a shaft angle after the edge switching that have been calculated by (Continued)

the tip position back calculation unit, a required change amount of the center position, and calculates a driving amount of a driving shaft for moving a tool rotation axis by the calculated change amount.

12 Claims, 3 Drawing Sheets (51) Int. Cl.
*B23Q 15/14* (2006.01)
*B23Q 15/22* (2006.01)
*B23Q 15/28* (2006.01)
*B23Q 17/00* (2006.01)
*G05B 19/18* (2006.01)
*G05B 19/19* (2006.01)
*G05B 19/4069* (2006.01)
*G05B 19/408* (2006.01)

(52) U.S. Cl.
CPC .............. *B23Q 15/14* (2013.01); *B23Q 15/22* (2013.01); *B23Q 15/28* (2013.01); *B23Q 17/00* (2013.01); *G05B 19/18* (2013.01); *G05B 19/19* (2013.01); *G05B 19/4086* (2013.01); *G05B 2219/35311* (2013.01)

(58) Field of Classification Search
CPC .. G05B 19/19; G05B 19/404; G05B 19/4069; G05B 19/4086
USPC ........................................................ 700/193
See application file for complete search history.

(56) References Cited

U.S. PATENT DOCUMENTS

| | | | | |
|---|---|---|---|---|
| 6,266,571 | B1* | 7/2001 | Fado | G06F 3/165 |
| | | | | 700/94 |
| 6,775,586 | B2* | 8/2004 | Shibata | G05B 19/41 |
| | | | | 700/189 |
| 8,061,052 | B2* | 11/2011 | Song | B23Q 1/5406 |
| | | | | 33/1 BB |
| 8,988,032 | B2* | 3/2015 | Iwashita | G05B 19/4068 |
| | | | | 318/568.25 |
| 9,645,217 | B2* | 5/2017 | Morfino | G01R 35/00 |
| 10,180,675 | B2 | 1/2019 | Maeda et al. | |
| 12,411,472 | B2* | 9/2025 | Murakami | G05B 19/41 |
| 2002/0055805 | A1* | 5/2002 | Matsumoto | G05B 19/4163 |
| | | | | 700/182 |
| 2012/0007536 | A1* | 1/2012 | Iwashita | G05B 19/4069 |
| | | | | 318/573 |

FOREIGN PATENT DOCUMENTS

| | | |
|---|---|---|
| JP | 2004-261947 A | 9/2004 |
| JP | 2005-271148 A | 10/2005 |
| JP | 2011-123777 A | 6/2011 |
| JP | 2011-170584 A | 9/2011 |
| WO | 2018/122988 A1 | 7/2018 |

* cited by examiner

NUMERICAL CONTROL DEVICE, MACHINING SYSTEM SIMULATOR, AND NUMERICAL CONTROL PROGRAM

TECHNICAL FIELD

The present invention relates to a numerical control device, a machining system simulator, and a numerical control program.

BACKGROUND ART

A multi-edge tool having multiple machining edges equipped with blades for different purposes and capable of machining workpieces of various shapes has been known (see, e.g., Patent Document 1). An example of the multi-edge tools has the machining edges protruding in different directions from a tool rotation axis, and the machining edge used for the machining is selected by changing the angular position of the tool about the tool rotation axis.

Patent Document 1: Japanese Unexamined Patent Application, Publication No. H07-314290

DISCLOSURE OF THE INVENTION

Problems to be Solved by the Invention

In most cases, the coordinates of a drive axis for positioning a tool of a machine tool and the coordinates of a machining point at which the machining is actually done are misaligned with each other due to the shape of the tool, i.e., so-called offset occurs. The degree of offset varies depending on the direction of the tool. Thus, a numerical controller for controlling the machine tool is set considering the offset derived from the tool in advance to perform tip point control, i.e., processing for calculating the coordinates of the drive axis from the machining point specified by the machining program and the direction of the tool relative to the machining point.

When the multi-edge tool described above is used, the tip point control ends every time the machining edge used for the machining is changed, requiring an update of the setting value of the offset of the tool and the direction of the tool relative to the machining point before resuming the tip point control. For the existing numerical controller, the machining program is written to include commands instructing the tip point control to end, the setting value of the offset of the tool and the direction of the tool relative to the machining point to be updated, and the tip point control to resume, so that the machining using the multi-edge tool is performed.

However, statements about the tip point control written in the machining program complicate the machining program. This may easily cause errors in writing the machining program and increase the cycle time of the machining. Under these circumstances, a technique that allows easy setting of the tip point control is expected.

Means for Solving the Problems

In an aspect of the present disclosure, a numerical controller controls, according to a machining program, a machine tool that includes at least one tool rotation axis for changing an angle of a multi-edge tool having a plurality of machining edges capable of machining a workpiece and at least one drive axis for relative movement of the workpiece and the multi-edge tool, the machine tool performing switching of the machining edge in use for machining the workpiece to the machining edge used next by rotating about the tool rotation axis. The numerical controller includes: an edge shape information storage unit that stores geometric information of each of the machining edges of the multi-edge tool as edge shape information; a center point calculation unit that reads a tip point of the machining edge used and an axial angle of the tool rotation axis from the machining program to calculate a center point of rotation of the multi-edge tool based on the read tip point and axial angle and the edge shape information stored in the edge shape information storage unit; an edge switching determination unit that determines whether the switching of the machining edge is requested based on the machining program; a calculation method changing unit that changes, when the edge switching determination unit determines that the switching of the machining edge is requested, a method of calculation of the center point by the center point calculation unit with the switching of the machining edge taking the edge shape information into account; a tip point back calculation unit that back-calculates the tip point of the machining edge used after the switching from the center point just before the switching of the machining edge based on the method of calculation changed by the calculation method changing unit with the switching of the machining edge; and a change amount calculation unit that calculates a required amount of change of the center point based on the tip point of the machining edge and the axial angle after the switching calculated by the tip point back calculation unit and the tip point of the machining edge and the axial angle before the switching.

In an aspect of the present disclosure, a machining system simulator simulates an operation of a machining system including a machine tool that includes at least one tool rotation axis for changing an angle of a multi-edge tool having a plurality of machining edges capable of machining a workpiece and at least one drive axis for relative movement of the workpiece and the multi-edge tool, the machine tool performing switching of the machining edge in use for machining the workpiece to the machining edge used next by rotating about the tool rotation axis, and a numerical controller for controlling the machine tool according to a machining program. The machining system simulator includes: an edge shape information storage unit that stores geometric information of each of the machining edges of the multi-edge tool as edge shape information; a center point calculation unit that reads a tip point of the machining edge used and an axial angle of the tool rotation axis from the machining program to calculate a center point of rotation of the multi-edge tool based on the read tip point and axial angle and the edge shape information stored in the edge shape information storage unit; an edge switching determination unit that determines whether the switching of the machining edge is requested based on the machining program; a calculation method changing unit that changes, when the edge switching determination unit determines that the switching of the machining edge is requested, a method of calculation of the center point by the center point calculation unit with the switching of the machining edge taking the edge shape information into account; a tip point back calculation unit that back-calculates the tip point of the machining edge used after the switching from the center point just before the switching of the machining edge based on the method of calculation changed by the calculation method changing unit with the switching of the machining edge; and; a change amount calculation unit that calculates a required amount of change of the center point based on the tip point of the machining edge and the axial angle after the switching calculated by the tip point back calculation unit and the tip point of the machining edge and the axial angle before the switching.

In an aspect of the present disclosure, a numerical control program controls processing of a numerical controller that controls, according to a machining program, a machine tool that includes at least one tool rotation axis for changing an angle of a multi-edge tool having a plurality of machining edges capable of machining a workpiece and at least one drive axis for relative movement of the workpiece and the multi-edge tool, the machine tool performing switching of the machining edge in use for machining the workpiece to the machining edge used next by rotating about the tool rotation axis. The numerical control program includes: a center point calculation control unit that reads a tip point of the machining edge used and an axial angle of the tool rotation axis from the machining program to calculate a center point of rotation of the multi-edge tool based on the read tip point and axial angle and edge shape information including geometric information of each of the machining edges of the multi-edge tool; an edge switching determination control unit that determines whether the switching of the machining edge is requested based on the machining program; a calculation method change control unit that changes, when the edge switching determination control unit determines that the switching of the machining edge is requested, a method of calculation of the center point by the center point calculation control unit with the switching of the machining edge taking the edge shape information into account; a tip point back calculation control unit that back-calculates the tip point of the machining edge used after the switching from the center point just before the switching of the machining edge based on the method of calculation changed by the calculation method change control unit with the switching of the machining edge; and, a change amount calculation control unit that calculates a required amount of change of the center point based on the tip point of the machining edge and the axial angle after the switching calculated by the tip point back calculation control unit and the tip point of the machining edge and the axial angle before the switching.

Effects of the Invention

The present disclosure provides a numerical controller, a machining system simulator, and a numerical control program that allow easy setting of tip point control.

PREFERRED MODE FOR CARRYING OUT THE INVENTION

Figure 1:
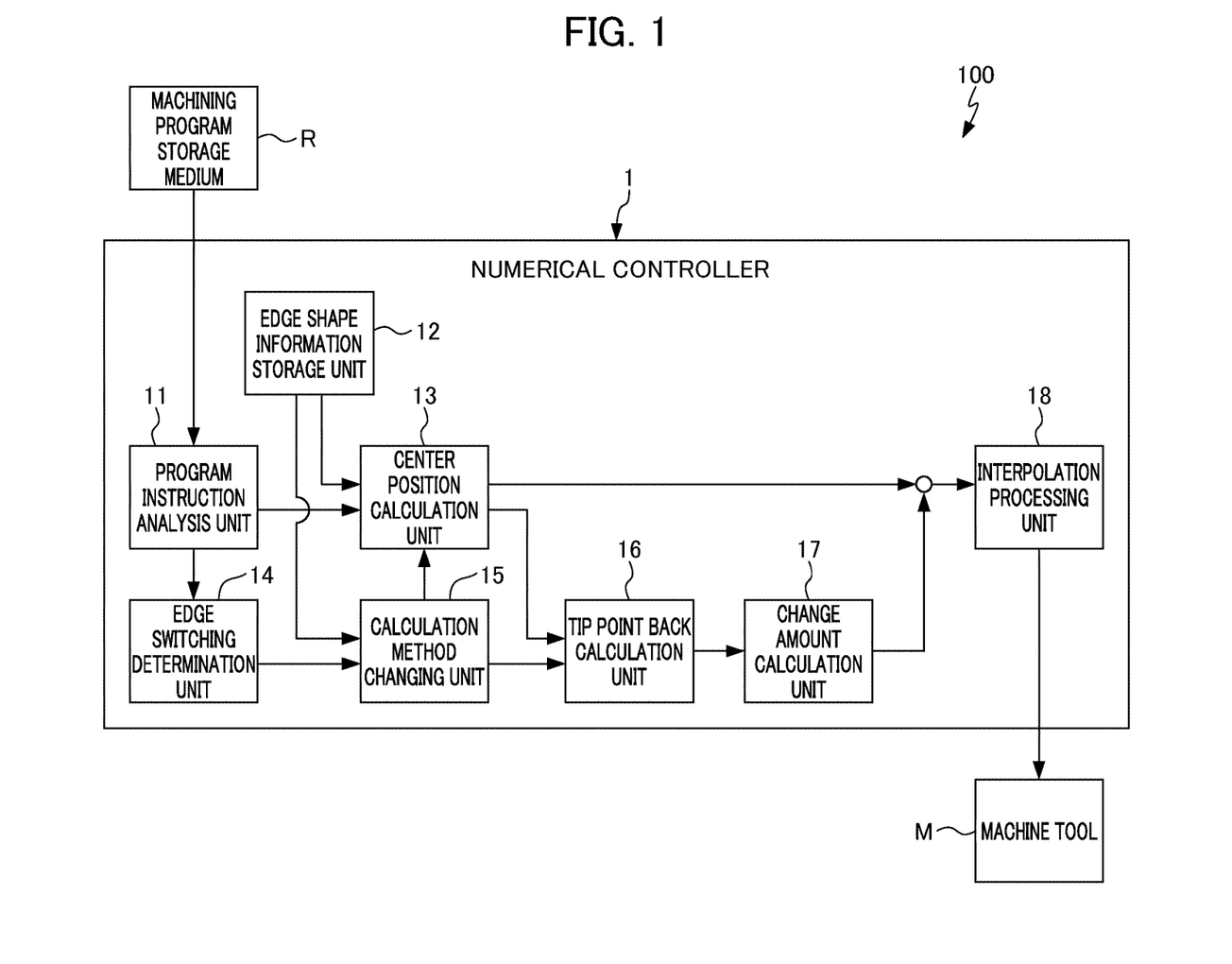
FIG. 1 is a block diagram illustrating a configuration of a machining system including a numerical controller of an embodiment of the present disclosure.

Embodiments of the present disclosure will be described below with reference to the drawings. FIG. 1 is a block diagram illustrating a configuration of a machining system 100 including a numerical controller 1 of an embodiment of the present disclosure.

The machining system 100 includes a machine tool M, a numerical controller 1 for controlling the machine tool M according to a machining program, and a machining program storage medium R that provides the machining program for the numerical controller 1.

Figure 2:
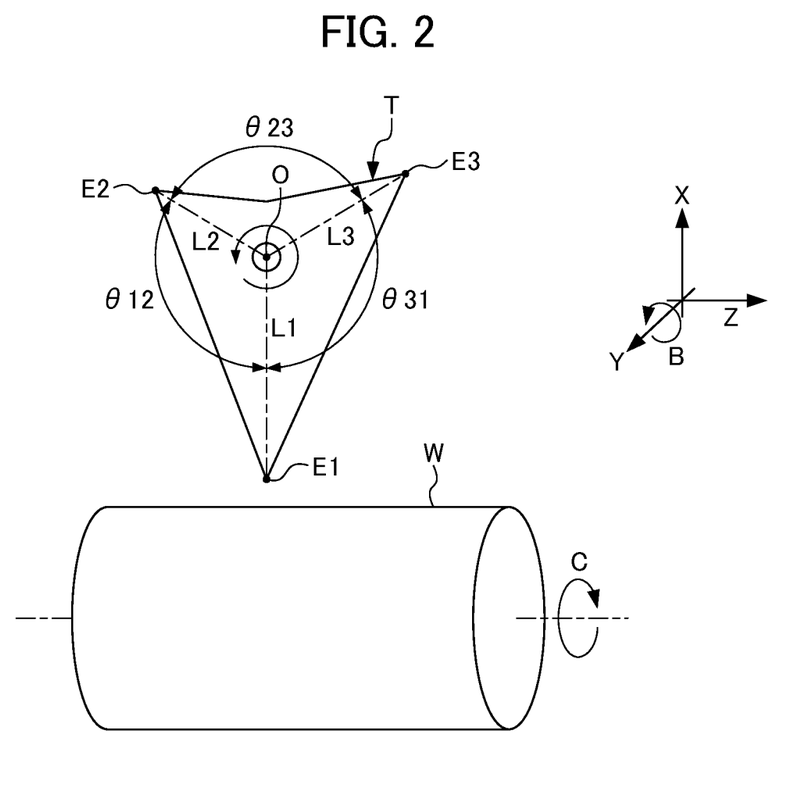
FIG. 2 is a schematic view illustrating a relationship between axes of a machine tool and a multi-edge tool.

The machine tool M machines a workpiece W using a multi-edge tool T having a plurality of machining edges (a first machining edge E1, a second machining edge E2, and a third machining edge E3) capable of machining the workpiece W as shown in FIG. 2. Thus, the machine tool M has at least one tool rotation axis (axis B in the example of FIG. 2) for changing the angle of the multi-edge tool T and at least one drive axis (X and Z axes in FIG. 2) for relative movement of the workpiece W and the multi-edge tool T. The machine tool M performs switching of the machining edge E1, E2, E3 in use for machining the workpiece W to the machining edge E1, E2, E3 used next by rotating about the tool rotation axis.

As shown in FIG. 2, the machine tool M is typically a lathe that rotates the workpiece W with a main shaft C, for example, and brings any one of the machining edges E1, E2, E3 of the multi-edge tool T into contact with the workpiece W to cut the workpiece W. Note that the machine tool T is not limited to the lathe and may be other machine tool such as a planer.

The machining program storage medium R can be constituted of, for example, a disk storage device or a nonvolatile memory. The machining program storage medium R may be integrated with the numerical controller 1. Specifically, the machining program storage medium R may be part of a storage area of the numerical controller 1.

The machining program is written in a language such as G-code and describes, for example, the coordinates of multiple way points that the tip point of the machining edge E1, E2, E3, which is a machining point of the multi-edge tool T, should pass, a moving speed of the machining edge E1, E2, E3 passing the way points, and the curvature of a path between the way points, in different statements. The machining program also includes commands instructing that any of the tip points of the machining edges E1, E2, E3 should pass the way points.

The numerical controller 1 controls the operation of the machine tool M that machines the workpiece W according to the machining program provided by the machining program storage medium R. The numerical controller 1 can be achieved by allowing a computer device including a CPU, memory, and an input/output interface to execute an appropriate numerical control program. The numerical control program for achieving the numerical controller 1 is an embodiment of the numerical control program that is the subject matter of the present disclosure and can be provided as a program stored in a storage medium that stores a program non-transitory.

The numerical controller 1 includes a program instruction analysis unit 11, an edge shape information storage unit 12, a center point calculation unit 13, an edge switching determination unit 14, a calculation method changing unit 15, a tip point back calculation unit 16, a change amount calculation unit 17, and an interpolation processing unit 18. These components are merely examples of classified functions of the numerical controller 1, and their physical and programmatic configurations do not have to be clearly distinctive.

The program instruction analysis unit 11 reads and analyzes the machining program provided by the machining program storage medium R on a statement basis. Specifically, the program instruction analysis unit 11 interprets the machining program into data that can be processed by the numerical controller 1.

The edge shape information storage unit 12 stores geometric information of each of the machining edges E1, E2, E3 of the multi-edge tool T as edge shape information. The edge shape information storage unit 12 may be configured to acquire the edge shape information of the multi-edge tool T from the machining program to temporarily store the edge shape information when the machining program is running.

For specification of the tip point of each machining edge E1, E2, E3, the edge shape information preferably includes an angle θ12, θ23, θ31 formed between each adjacent pair of the machining edges E1, E2, E3 relative to the center of rotation O and a distance L1, L2, L3 from the tip of the machining edge E1, E2, E3 to the center of rotation O. For specification of the tip point of each machining edge E1, E2, E3, the edge shape information may include a distance between the tips of each adjacent pair of the machining edges E1, E2, E3 and an angle of the tip point of each machining edge E1, E2, E3 viewed from the center of rotation O in a predetermined direction. The edge shape information may also include a radius of curvature of a nose of the machining edge E1, E2, E3.

The center point calculation unit 13 reads the tip point of the machining edge E1, E2, E3 used and an axial angle of the tool rotation axis from the machining program to calculate a center point of rotation of the multi-edge tool T (the coordinates of the center of rotation O) based on the read tip point and axial angle and the edge shape information stored in the edge shape information storage unit 12. In the following description, the number n is given to the machining edge used before the switching, and the number m is given to the machining edge used after the switching.

Figure 3:
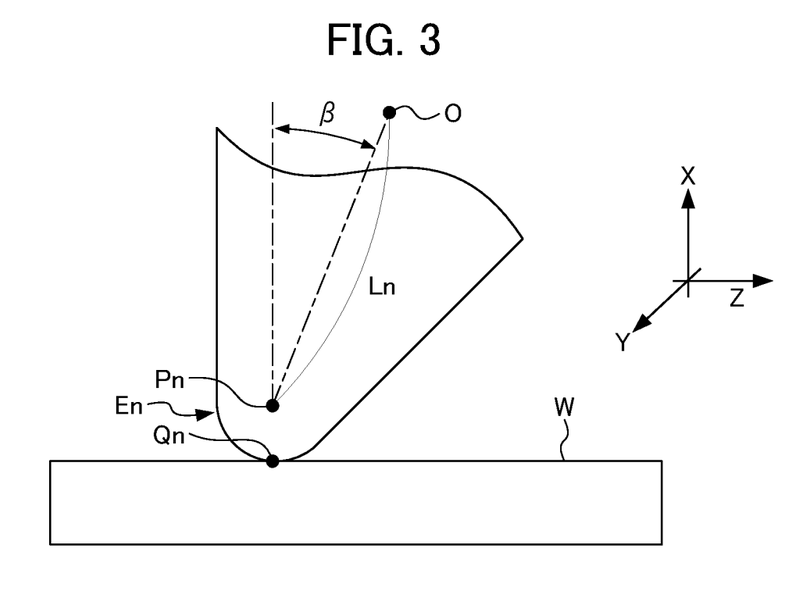
FIG. 3 is a schematic view illustrating a relationship between a tip point and center of rotation of the multi-edge tool.

As shown in FIG. 3, when the tip point of the machining edge En is the center of curvature Pn of a nose of the machining edge En, and the axial angle β is an angle of inclination of the machining edge En relative to the direction of the normal to the surface of the workpiece W (X direction), the center point of the multi-edge tool T, i.e., the coordinates of the center of rotation O (Zn, Xn), can be represented by the following formula (1) using the coordinates (ZPn, XPn) of the tip point of the machining edge En (center of curvature Pn) and a distance Ln from the machining edge En to the center of rotation O according to the machining program.

[Formula 1]

$$\begin{bmatrix} Z_n \\ X_n \end{bmatrix} = \begin{bmatrix} -\sin(\beta) & -\cos(\beta) \\ \cos(\beta) & -\sin(\beta) \end{bmatrix} \begin{bmatrix} 0 \\ L_n \end{bmatrix} + \begin{bmatrix} Z_{Pn} \\ X_{Pn} \end{bmatrix} \quad (1)$$

When the tip point of the machining edge En is a point of contact (contact point) Qn between the machining edge En and the workpiece W, the center point of the multi-edge tool T (Zn, Xn) during the machining with the machining edge En can be represented by the following formula (2) using the coordinates (ZQn, XQn) of the tip point (contact point Qn) of the machining edge En, the distance Ln from the machining edge En to the center of rotation O, and a vector from the contact point Qn to the center of curvature Pn (ZQnPn, XQnPn) according to the machining program.

[Formula 2]

$$\begin{bmatrix} Z_n \\ X_n \end{bmatrix} = \begin{bmatrix} -\sin(\beta) & -\cos(\beta) \\ \cos(\beta) & -\sin(\beta) \end{bmatrix} \begin{bmatrix} 0 \\ L_n \end{bmatrix} + \begin{bmatrix} Z_{QnPn} \\ X_{QnPn} \end{bmatrix} + \begin{bmatrix} Z_{Qn} \\ X_{Qn} \end{bmatrix} \quad (2)$$

Thus, the center point calculation unit 13 can accurately calculate the coordinates of the center of rotation O by a matrix operation using a vector for defining a reference point of the tool rotation axis, a vector from the tip point to the center point, and a rotation matrix defined by the axial angle.

The edge switching determination unit 14 determines whether the switching of the machining edge is requested based on the machining program. Specifically, the edge switching determination unit 14 determines whether each statement of the machining program includes a command that specifies the machining edge Em used next.

If the switching of the machining edge is done with any one of the machining edges E1, E2, E3 in contact with the workpiece W, the workpiece W may be scratched or the multi-edge tool T may be damaged. Thus, the machining program is written to switch the machining edge when the multi-edge tool T is separated from the workpiece W. The numerical controller 1 may be configured to separate the multi-edge tool T from the workpiece W when the request to switch the machining edge is detected and bring the multi-edge tool T close to the workpiece W after the switching.

When the edge switching determination unit 14 determines that the switching of the machining edge is requested, the calculation method changing unit 15 changes the method of calculation of the center point by the center point calculation unit 13 with the switching of the machining edge taking the edge shape information into account. Specifically, the calculation method changing unit 15 changes the formula for calculating the center point (the center of rotation O of the multi-edge tool T) based on the tip point of the machining edge En used before the switching (the coordinates of the center of curvature Pn or the contact point Qn) to the formula for calculating the center point based on the tip point of the machining edge Em used after the switching.

The calculation method changing unit 15 adds or subtracts an angular difference θnm between the machining edge En used before the switching and the machining edge Em used after the switching to or from the axial angle β before the switching depending on the direction of rotation to calculate the axial angle after the switching. The calculation method changing unit 15 also calculates the angular difference θnm between the machining edge used before the switching and the machining edge used after the switching and the rate of change in distance (Lm/ln) from the tip of the machining edge to the center point before and after the switching based on the shape information of the machining edge En used before the switching and the shape information of the machining edge Em used after the switching.

Then, based on the angular difference θnm between the machining edges En and Em and the rate of change in distance from the machining edges En and Em to the center point (Lm/Ln), the calculation method changing unit 15 changes the tip point of the machining edge, based on which the center point calculation unit 13 calculates the center point, from the tip point (ZPn, XPn) of the machining edge En used before the switching to the tip point (ZPm, XPm) of the machining edge used after the switching. When the formula for calculating the tip point (ZPm, XPm) of the machining edge and the center point (Zm, Xm) after the switching is derived in this manner, the change of the tool offset caused by the switching can be calculated.

Specifically, the calculation method changing unit 15 performs a matrix operation using a rotation matrix defined by the angular difference θnm between the machining edges En and Em. More specifically, the calculation method changing unit 15 generates a formula for calculating the center point, i.e., the coordinates of the center of rotation O (Zm, Xm), after the switching from the machining edge En to the next machining edge Em by multiplying the formula (1) or (2) by the rotation matrix for rotating the vector by the angular difference θnm between the tip point of the machining edge En used before the switching and the tip point of the machining edge Em used after the switching viewed from the center of rotation O and the ratio of the distance Lm between the machining edge Em used after the switching and the center of rotation O to the distance Ln between the tip point of the machining edge En used before the switching and the center of rotation O. Thus, the formula for calculating the center point (Zm, Xm) after the switching can be relatively easily derived by the matrix operation using the formula for calculating the center point (Zn, Xn) before the switching.

When the tip point of the machining edge En, Em is the center of curvature Pn, Pm, i.e., the formula (1) is changed, the following formula (3) is met. When the tip point of the machining edge En, Em is the contact point Qn, Qm on the workpiece W, i.e., the formula (2) is changed, the following formula (4) is met.

[Formula 3]

$$\begin{bmatrix} Z_m \\ X_m \end{bmatrix} = \begin{bmatrix} -\sin(\beta + \theta_{nm}) & -\cos(\beta + \theta_{nm}) \\ \cos(\beta + \theta_{nm}) & -\sin(\beta + \theta_{nm}) \end{bmatrix} \begin{bmatrix} 0 \\ L_m \end{bmatrix} + \begin{bmatrix} Z_{Pm} \\ X_{Pm} \end{bmatrix} \quad (3)$$

[Formula 4]

$$\begin{bmatrix} Z_m \\ X_m \end{bmatrix} = \begin{bmatrix} -\sin(\beta + \theta_{nm}) & -\cos(\beta + \theta_{nm}) \\ \cos(\beta + \theta_{nm}) & -\sin(\beta + \theta_{nm}) \end{bmatrix} \begin{bmatrix} 0 \\ L_m \end{bmatrix} + \begin{bmatrix} Z_{QmPm} \\ X_{QmPm} \end{bmatrix} + \begin{bmatrix} Z_{Qm} \\ X_{Qm} \end{bmatrix} \quad (4)$$

The tip point back calculation unit 16 back-calculates the tip point of the machining edge used after the switching (the center of curvature Pm or the contact point Qm) from the center point (Zn, Xn) just before the switching of the machining edge based on the method of calculation changed by the calculation method changing unit 15 with the switching of the machining edge, i.e., the formula (3) or (4). Thus, the tip point back calculation unit 16 performs a matrix operation using a vector for defining the reference point of the tool rotation axis, a vector from the tip point to the center point, a rotation matrix defined by the axial angle, and a rotation matrix defined by an angle formed between the machining edges. Specifically, the tip point back calculation unit 16 substitutes the value of the center point (Zn, Xn) just before the switching for the center point (Zm, Xm) in the formula (3) or (4) to calculate the coordinates of the center of curvature Pm (ZPm, XPm) or the coordinates of the contact point Qm (ZQm, XQm). Thus, the tip point of the machining edge used after the switching (ZPm, XPm) or (ZQm, XQm) can be checked.

The change amount calculation unit 17 calculates a required amount of change of the center point based on the tip point (ZPm, XPm) or (ZQm, XQm) and the axial angle (β+θnm) after the switching calculated by the tip point back calculation unit 16 and the tip point (ZPn, XPn) or (ZQn, XQn) and the axial angle β before the switching. Specifically, the change amount calculation unit 17 calculates the amount of change of the tip point and the amount of change of the axial angle before and after the switching, i.e., a difference vector between the center point (Zn, Xn) before the switching and the center point (Zm, Xm) after the switching, and adds or subtracts the calculated amounts of change to or from the tip point of the machining edge used before the switching to calculate the tip point of the machining edge used after the switching. This calculation allows accurate calculation of the tip point of the machining edge used after the switching.

Based on the tip point of the machining edge used after the switching, the change amount calculation unit 17 calculates the amount of offset of the coordinate system of the drive axis relative to the machining point (the center of curvature Pm or contact point Qm of the machining edge Em) specified by the machining program and reflects the calculated offset amount on the setting value of the tip point control. This can accurately change the setting of the tip point control.

The interpolation processing unit 18 calculates the coordinates of the drive axis at each time point between the coordinates corresponding to the way points specified in the machining program to generate a command value outputted to the machine tool M.

As described above, the numerical controller 1 includes the edge shape information storage unit 12, the center point calculation unit 13, the edge switching determination unit 14, the calculation method changing unit 15, the tip point back calculation unit 16, and the change amount calculation unit 17. Thus, simple specification of the machining edge E1, E2, E3 of the multi-edge tool T to be used for the machining in the machining program can optimize the offset between the coordinates of the drive axis of the machine tool M and the coordinates of the machining point for the machining edge E1, E2, E3 used for the machining. The numerical controller 1 thus requires no setting processing for the tip point control when switching the machining edge E1, E2, E3 of the multi-edge tool T to the machining edge E1, E2, E3 used next. This allows appropriate tip point control and easy writing of the machining program and reduces delay due to change of the setting of the tip point control.

As can be clearly understood from the description about the numerical controller 1, a numerical control program of an embodiment of the present disclosure includes: a center point calculation control unit that the center point calculation unit 13, an edge switching determination control unit that implements the edge switching determination unit 14, a calculation method change control unit that implements the calculation method changing unit 15, a tip point back calculation control unit that implements the tip point back calculation unit 16, and a change amount calculation control unit that implements the change amount calculation unit 17. The numerical control program allows easy and reliable setting of the tip point control as described above.

Figure 4:
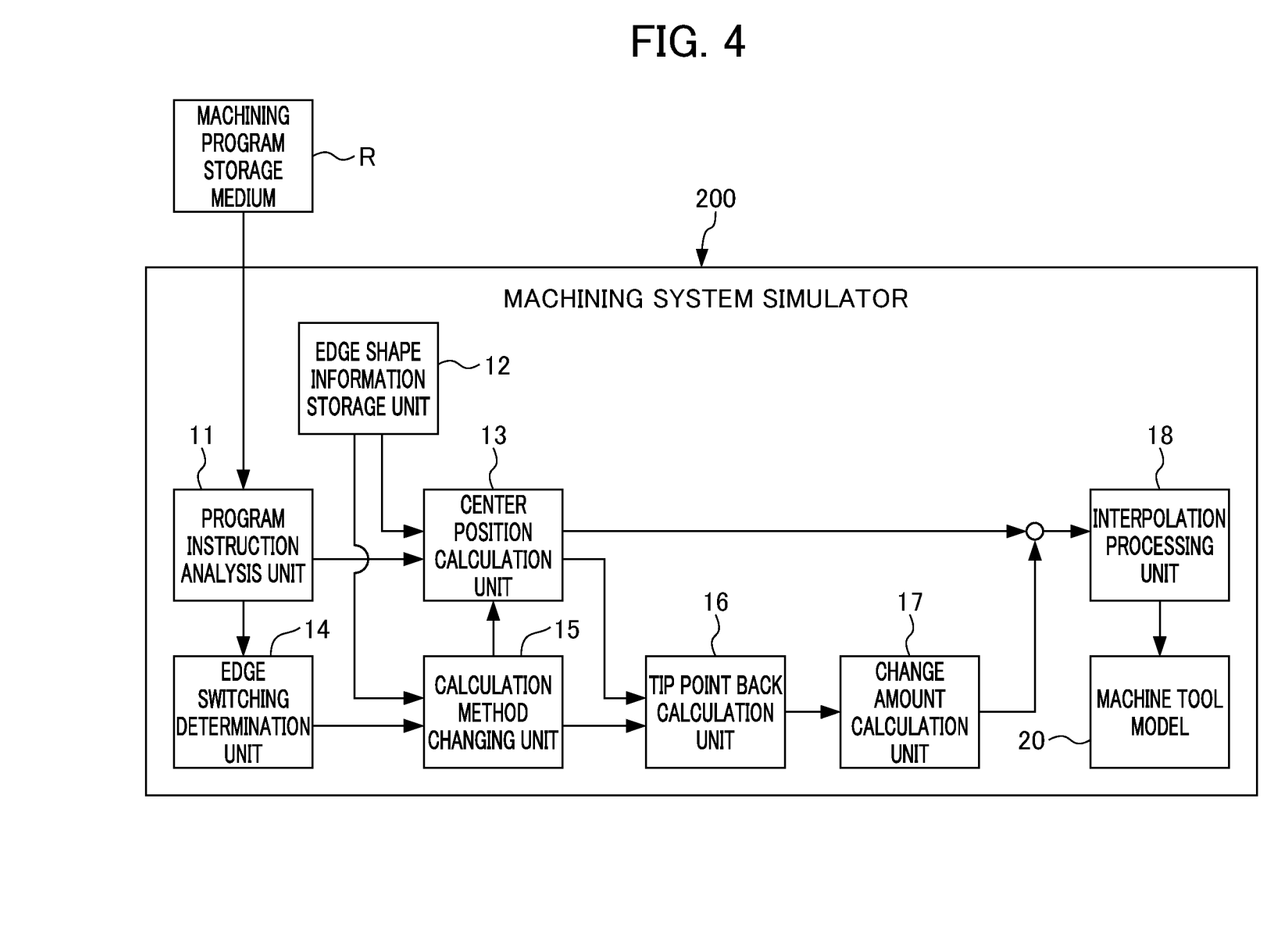
FIG. 4 is a block diagram illustrating a configuration of a machining system simulator of an embodiment of the present disclosure.

FIG. 4 shows a configuration of a machining system simulator 200 of an embodiment of the present disclosure. The machining system simulator 200 simulates the operation of the machining system 100 including the machine tool M and the numerical controller 1 of FIG. 1.

The machining system simulator 200 can be implemented by running an appropriate simulation program on a computer device including a CPU, memory, and an input/output interface. Some of the components of the machining system simulator 200 of FIG. 4 can be the same as those of the numerical controller 1 of FIG. 1. Thus, the same reference characters used in FIG. 1 may be given to the same components of the machining system simulator 200 as those of the numerical controller 1, without duplicative description.

The machining system simulator 200 includes a program instruction analysis unit 11, an edge shape information storage unit 12, a center point calculation unit 13, an edge switching determination unit 14, a calculation method changing unit 15, a tip point back calculation unit 16, a change amount calculation unit 17, an interpolation processing unit 18, and a machine tool model 20. The machining system simulator 200 may include a machining program storage medium R.

The machine tool model 20 is a model of the machine tool M, the workpiece W, and the multi-edge tool T generated on the computer to virtually simulate the operation of the machine tool M according to a command value generated by the interpolation processing unit 18.

The machining system simulator 200 can check whether the machining program is appropriately written, i.e., whether the workpiece W can be machined as intended when the machining system 100 runs the machining program. The machining system simulator 200 does not operate the machine tool M, and thus does not waste the workpiece W or damage the machine tool M and the multi-edge tool T, although the machining program is inappropriate.

Embodiments of the present disclosure have just been described above, but the present invention is not limited to those exemplary embodiments. The advantages described in the embodiments are merely listed as the most suitable advantages derived from the present invention, and do not limit the advantages of the present invention.

For example, the formulae described in the embodiment are merely examples, and a point of the machining edge farthest from the center of rotation of the multi-edge tool can be set as the tip point.

The multi-edge tool may have two or more machining edges.

EXPLANATION OF REFERENCE NUMERALS

1 Numerical controller
11 Program instruction analysis unit
12 Edge shape information storage unit
13 Center point calculation unit
14 Edge switching determination unit
15 Calculation method changing unit
16 Tip point back calculation unit
17 Change amount calculation unit
18 Interpolation processing unit
20 Machine tool model
100 Machining system
200 Machining system simulator
E1, E2, E3 Machining edge
M Machine tool
R Machining program storage medium
T Multi-edge tool
W Workpiece

The invention claimed is:

1. A numerical controller for controlling, according to a machining program, a machine tool that includes at least one tool rotation axis for changing an angle of a multi-edge tool having a plurality of machining edges capable of machining a workpiece and at least one drive axis for relative movement of the workpiece and the multi-edge tool, the machine tool performing switching of the machining edge in use for machining the workpiece to the machining edge used next by rotating about the tool rotation axis, the numerical controller comprising:

an edge shape information storage unit that stores geometric information of each of the machining edges of the multi-edge tool as edge shape information;

a center point calculation unit that reads a tip point of the machining edge used and an axial angle of the tool rotation axis from the machining program to calculate a center point of rotation of the multi-edge tool based on the read tip point and axial angle and the edge shape information stored in the edge shape information storage unit;

an edge switching determination unit that determines whether the switching of the machining edge is requested based on the machining program;

a calculation method changing unit that changes, when the edge switching determination unit determines that the switching of the machining edge is requested, a method of calculation of the center point by the center point calculation unit with the switching of the machining edge taking the edge shape information into account;

a tip point back calculation unit that back-calculates the tip point of the machining edge used after the switching from the center point just before the switching of the machining edge based on the method of calculation changed by the calculation method changing unit with the switching of the machining edge; and a change amount calculation unit that calculates a required amount of change of the center point based on the tip point of the machining edge and the axial angle after the switching calculated by the tip point back calculation unit and the tip point of the machining edge and the axial angle before the switching.

2. The numerical controller of claim 1, wherein the edge shape information includes an angle formed between the machining edges relative to a center of rotation of the multi-edge tool and distances from tips of the machining edges to the center of rotation.

3. The numerical controller of claim 1, wherein the tip point of the machining edge is a center of curvature of a nose of the machining edge or a point of contact between the machining edge and the workpiece.

4. The numerical controller of claim 1, wherein the calculation method changing unit calculates an angle formed between the machining edge used before the switching and the machining edge used after the switching and a rate of change in distance from the tip of the machining edge to the center point before and after the switching based on the shape information of the machining edge used before the switching and the shape information of the machining edge used after the switching, and changes the tip point of the machining edge, based on which the center point calculation unit calculates the center point, from the tip point of the machining edge used before the switching to the tip point of the machining edge used after the switching based on the angle formed between the machining edges and the rate of change in distance to the center point.

5. The numerical controller of claim 1, wherein the center point calculation unit performs a matrix operation using a vector for defining a reference point of the tool rotation axis, a vector from the tip point to the center point, and a rotation matrix defined by the axial angle.

6. The numerical controller of claim 1, wherein the calculation method changing unit performs a matrix operation using a rotation matrix defined by the angle formed between the machining edges.

7. The numerical controller of claim 1, wherein the tip point back calculation unit performs a matrix operation using a vector for defining a reference point of the tool rotation axis, a vector from the tip point to the center point, a rotation matrix defined by the axial angle, and a rotation matrix defined by an angle formed between the machining edges.

8. The numerical controller of claim 1, wherein the calculation method changing unit adds or subtracts an angular difference between the machining edge used before the switching and the machining edge used after the switching to or from the axial angle before the switching to calculate the axial angle after the switching.

9. The numerical controller of claim 1, wherein the change amount calculation unit calculates an amount of change of the tip point and an amount of change of the axial angle before and after the switching and adds or subtracts the calculated amounts of change to or from the tip point of the machining edge used before the switching.

10. The numerical controller of claim 1, wherein the change amount calculation unit calculates an amount of change of the tip point and an amount of change of the axial angle before and after the switching and moves the multi-edge tool by the amounts of change.

11. A machining system simulator for simulating an operation of a machining system including a machine tool that includes at least one tool rotation axis for changing an angle of a multi-edge tool having a plurality of machining edges capable of machining a workpiece and at least one drive axis for relative movement of the workpiece and the multi-edge tool, the machine tool performing switching of the machining edge in use for machining the workpiece to the machining edge used next by rotating about the tool rotation axis, and a numerical controller for controlling the machine tool according to a machining program, the machining system simulator comprising:
- an edge shape information storage unit that stores geometric information of each of the machining edges of the multi-edge tool as edge shape information;
- a center point calculation unit that reads a tip point of the machining edge used and an axial angle of the tool rotation axis from the machining program to calculate a center point of rotation of the multi-edge tool based on the read tip point and axial angle and the edge shape information stored in the edge shape information storage unit;
- an edge switching determination unit that determines whether the switching of the machining edge is requested based on the machining program;
- a calculation method changing unit that changes, when the edge switching determination unit determines that the switching of the machining edge is requested, a method of calculation of the center point by the center point calculation unit with the switching of the machining edge taking the edge shape information into account;
- a tip point back calculation unit that back-calculates the tip point of the machining edge used after the switching from the center point just before the switching of the machining edge based on the method of calculation changed by the calculation method changing unit with the switching of the machining edge; and
- a change amount calculation unit that calculates a required amount of change of the center point based on the tip point of the machining edge and the axial angle after the switching calculated by the tip point back calculation unit and the tip point of the machining edge and the axial angle before the switching.

12. A non-transitory storage medium which non-transitorily stores a numerical control program for controlling processing of a numerical controller that controls, according to a machining program, a machine tool that includes at least one tool rotation axis for changing an angle of a multi-edge tool having a plurality of machining edges capable of machining a workpiece and at least one drive axis for relative movement of the workpiece and the multi-edge tool, the machine tool performing switching of the machining edge in use for machining the workpiece to the machining edge used next by rotating about the tool rotation axis, the numerical control program comprising:
- a center point calculation control unit that reads a tip point of the machining edge used and an axial angle of the tool rotation axis from the machining program to calculate a center point of rotation of the multi-edge tool based on the read tip point and axial angle and edge shape information including geometric information of each of the machining edges of the multi-edge tool;
- an edge switching determination control unit that determines whether the switching of the machining edge is requested based on the machining program;
- a calculation method change control unit that changes, when the edge switching determination control unit determines that the switching of the machining edge is requested, a method of calculation of the center point by the center point calculation control unit with the switching of the machining edge taking the edge shape information into account;
- a tip point back calculation control unit that back-calculates the tip point of the machining edge used after the switching from the center point just before the switching of the machining edge based on the method of calculation changed by the calculation method change control unit with the switching of the machining edge; and
- a change amount calculation control unit that calculates a required amount of change of the center point based on the tip point of the machining edge and the axial angle after the switching calculated by the tip point back calculation control unit and the tip point of the machining edge and the axial angle before the switching.

* * * * *